(12) United States Patent
Shinn

(10) Patent No.: US 7,073,386 B2
(45) Date of Patent: Jul. 11, 2006

(54) MULTI-BORE PRESSURE SENSING PROBE

(75) Inventor: Hyoun-Woo Shinn, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/867,156

(22) Filed: Jun. 14, 2004

(65) Prior Publication Data

US 2005/0274178 A1  Dec. 15, 2005

(51) Int. Cl.
*G01L 9/00* (2006.01)
(52) U.S. Cl. ..................... 73/700; 73/861.66
(58) Field of Classification Search .............. 73/700, 73/756, 861.66, 861.52, 753
See application file for complete search history.

(56) References Cited

U.S. PATENT DOCUMENTS

| | | |
|---|---|---|
| 3,977,249 A | 8/1976 | Wittig |
| 4,433,584 A * | 2/1984 | Kokoszka et al. ....... 73/861.66 |
| 4,957,007 A | 9/1990 | Gray |
| 5,466,067 A * | 11/1995 | Hagen et al. ............... 374/138 |
| 5,664,804 A * | 9/1997 | Saccone ..................... 280/737 |
| 6,314,821 B1 * | 11/2001 | Allan ....................... 73/861.52 |
| 6,644,112 B1 | 11/2003 | Schulze |
| 6,708,568 B1 * | 3/2004 | Gleeson et al. ............... 73/756 |
| 6,848,319 B1 * | 2/2005 | Gleeson et al. ............... 73/756 |
| 6,857,320 B1 * | 2/2005 | Gleeson et al. ............... 73/756 |
| 2004/0134284 A1 * | 7/2004 | Gleeson et al. ............... 73/756 |
| 2004/0200288 A1 * | 10/2004 | Gleeson et al. ............... 73/753 |

* cited by examiner

*Primary Examiner*—Edward Lefkowitz
*Assistant Examiner*—Andre Allen
(74) *Attorney, Agent, or Firm*—Adams Evans P.A.

(57) ABSTRACT

A pressure sensing probe having a probe body defining at least two bores communicating with respective bore entrance openings and bore exit openings therein for receiving a fluid flow into the bore entrance openings and through the bores. The bore entrance openings are aligned along an axis parallel with a longitudinal axis of the probe body for permitting alignment of the plurality of bore entrance openings along the plane of a longitudinal flow being sensed. The bore exit openings are adapted for communication with respective sensors for sensing the fluid flow and converting the fluid flow into a signal for downstream signal processing.

17 Claims, 7 Drawing Sheets

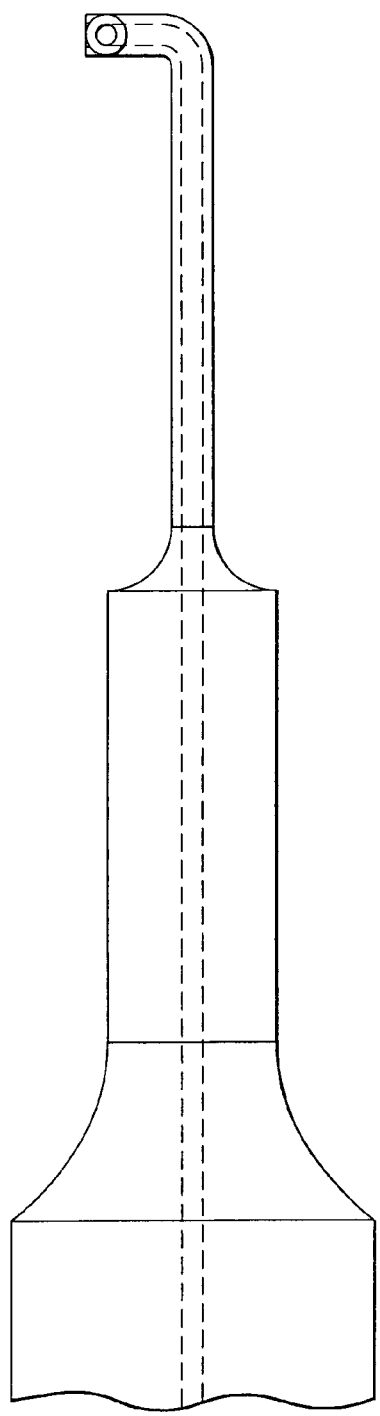
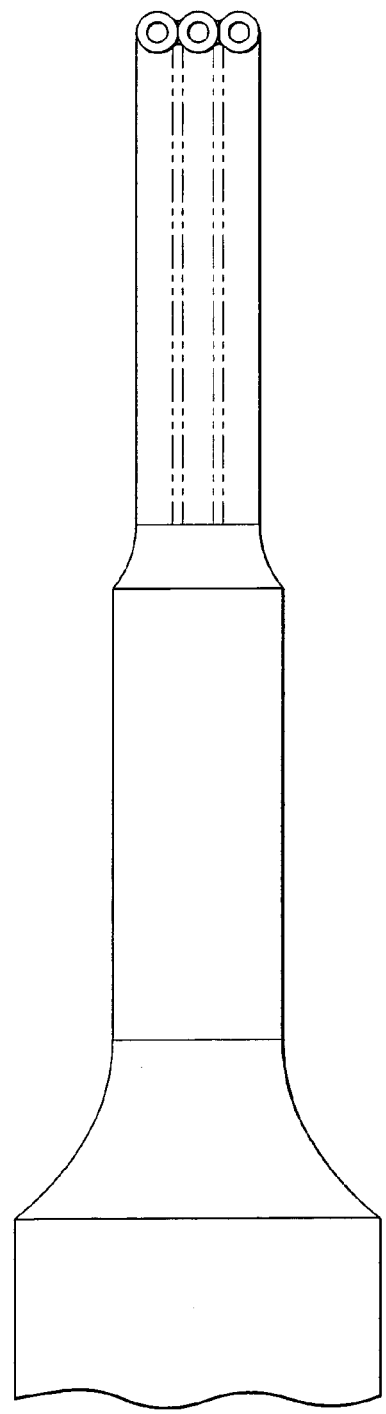
FIG. 1
(PRIOR ART)
FIG. 2
(PRIOR ART)

MULTI-BORE PRESSURE SENSING PROBE

TECHNICAL FIELD

This invention relates to a multi-bore pressure sensing probe having particular application for determining airfoil wake profiles in turbomachines, such as turbofan jet engines.

BACKGROUND OF THE INVENTION

The term "airfoil" broadly describes several species of elongate machined parts, such as blades, vanes and nozzles. The wake profile of an airfoil includes data related to flow angle and total pressure. In airfoil testing, the wake profile of an airfoil is determined by traversing a probe in a circumferential direction blade to blade at various radial locations. The probe moves continuously in the circumferential direction while three pressures from three holes and information indicating probe location are simultaneously recorded.

All known commercially available 3-hole probes measure flow angle and total pressure using three sensor holes aligned perpendicular to the probe axis. See FIGS. 1 and 2. Such probes can be used to determine flow direction, i.e., a yaw angle, based on the pressure difference between the outermost holes.

In turbomachinery testing, such probes are usually inserted into the test location radially. Since the trailing edge of the airfoil is also radially-extending, or very nearly so, the probe holes are aligned perpendicularly to the trailing edges. Probes oriented in this manner cannot measure airfoil wakes accurately because the pressure gradient of the wake is very large. A large pressure gradient across the probe width results in a single hole being located in the wake while the other two holes are located outside of the wake, that leaves erroneous flow direction information.

BRIEF DESCRIPTION OF THE INVENTION

In one embodiment of the invention, a probe is provided for determining wake flow characteristics of an airfoil.

In another embodiment of the invention, a multi-bore probe is provided for determining wake flow characteristics of an airfoil longitudinally along its trailing edge.

In another embodiment of the invention, a three hole probe is provided for determining the flow angle and total pressure of the wake of an airfoil longitudinally along its trailing edge.

According to one aspect of the invention, a pressure sensing probe is provided, comprising a probe body, the probe body defining at least two bores communicating with respective bore entrance openings and bore exit openings therein for receiving a fluid flow into the bore entrance openings and through the bores. The bore entrance openings are aligned along an axis of symmetry parallel with a longitudinal axis of the probe body for permitting alignment of the plurality of bore entrance openings along the plane of a longitudinal flow direction being sensed. The bore exit openings are adapted for communication with respective sensors for sensing the fluid flow and converting the fluid flow into a signal for downstream signal processing.

According to another aspect of the invention, the probe body defines three bores having respective adjacent bore entrance openings.

According to another aspect of the invention, wherein the probe body defines a centrally-disposed bore opening and two opposed outer bore openings, the two opposed outer bore openings each define an offset angle from an axis of flow of the centrally-disposed bore opening, the offset angles of the outer bore openings being preferably 45 degrees.

According to another aspect of the invention, the probe body defines a unitary elongate structure having the bores integrally-formed therein.

According to another aspect of the invention, the probe body defines a right-angle bend proximate the bore entrance openings.

According to another aspect of the invention, a pressure sensing probe is provided for measuring flow angle and total pressure on a trailing edge of an airfoil of a turbomachine, and comprises an elongate probe body, the probe body defining a plurality of bores communicating with respective adjacent and axially-aligned bore entrance openings and bore exit openings therein for receiving an airflow wake fluid flow into the bore entrance openings and through the bores. The bore entrance openings are aligned along an axis of symmetry parallel with a longitudinal axis of the probe body for permitting alignment of the plurality of bore entrance openings and the elongate probe body parallel to the airfoil wake generated by the airfoil. The bore exit openings are adapted for communication with respective sensors for sensing the airfoil wake fluid flow and converting the fluid flow into a signal for downstream signal processing into data representing values selected from the group consisting of flow angle and total pressure of the airfoil wake.

According to another aspect of the invention, a method of sensing fluid flow along a plane of a longitudinal pressure transition boundary is provided, comprising the steps of providing a pressure sensing probe, comprising a probe body, the probe body defining at least two bores communicating with respective bore entrance openings and bore exit openings therein for receiving a fluid flow into the bore entrance openings and through the bores. The bore entrance openings are aligned along an axis of symmetry parallel with a longitudinal axis of the probe body. The bore exit openings are adapted for communication with respective sensors for sensing the fluid flow and converting the fluid flow into a signal for downstream signal processing. The probe is positioned relative to a flow direction wherein the longitudinal axis of the probe body and the bore entrance openings extend along the plane of a longitudinal flow direction. The fluid flow is intersected along the plane of the longitudinal flow direction, and the fluid flow is transmitted along the bores to respective fluid flow sensors adapted to convert the fluid flow into signals representative of the fluid flow. The fluid flow is converted into signals representative of the fluid flow. The signals are then transmitted to a downstream processor.

According to another aspect of the invention, a method is provided for measuring flow angle and total pressure on a trailing edge of an airfoil of a turbomachine, comprising the steps of providing an elongate probe body, the probe body defining a plurality of bores communicating with respective adjacent and axially-aligned bore entrance openings and bore exit openings therein for receiving an airflow wake fluid flow into the bore entrance openings and through the bores. The bore entrance openings are aligned along an axis of symmetry parallel with a longitudinal axis of the probe body. The plurality of bore entrance openings and the elongate probe body are positioned parallel to the airfoil wake generated by the airfoil. The bore exit openings are adapted for communication with respective sensors for sensing the airfoil wake fluid flow and converting the fluid flow into a signal for downstream signal processing. The probe is positioned relative to a flow direction wherein the longitudinal axis of the probe body and the bore entrance openings extend along the longitudinal axis of the airfoil wake generated by the airfoil. The airfoil intersects the wake in a plurality of spaced-apart positions along the longitudinal axis of the airfoil wake. The fluid flow is transmitted along the bores to respective fluid flow sensors adapted to convert the fluid flow into signals representative of the fluid flow of the airfoil wake. The fluid flow is converted into signals representative of the fluid flow of the airfoil wake, and the signals are transmitted to a downstream signal processor for determining at least one value selected from the group consisting of flow angle and total pressure of the airfoil wake.

According to another aspect of the invention, the probe body defines three bores having respective adjacent bore entrance openings.

According to another aspect of the invention, the probe is moved circumferentially and radially in relation to the airfoil trailing edge while pressures and probe location information is simultaneously sensed and recorded.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1 is a side elevation of a prior art 3-hole probe;

FIG. 2 is a front elevation of a prior art 3-hole probe;

DETAILED DESCRIPTION AND BEST MODE OF THE INVENTION

Figure 3:
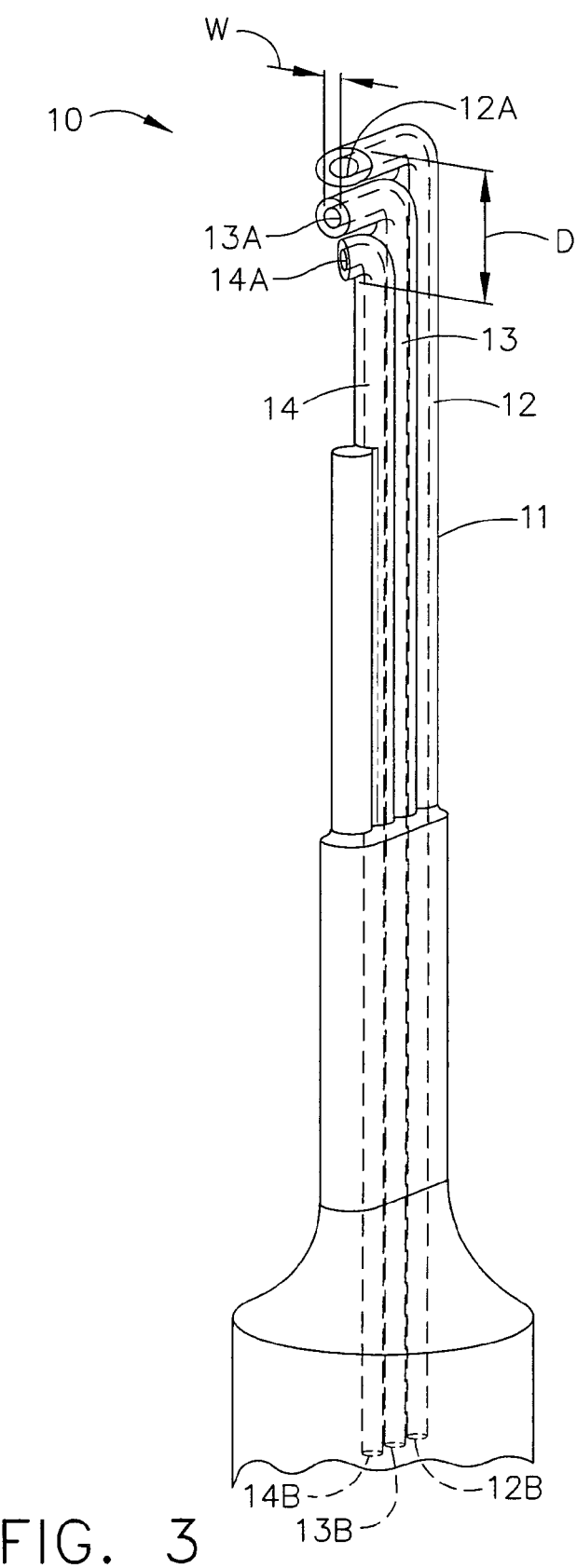
FIG. 3 is a front elevation of a 3-hole probe according to a preferred embodiment of the invention.
Figure 4:
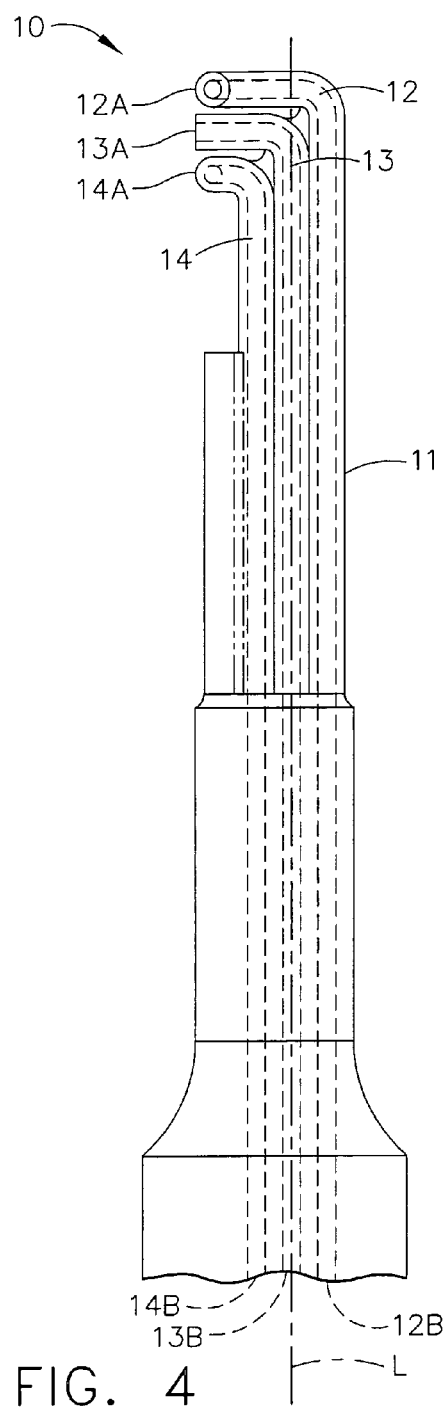
FIG. 4 is a side elevation of a 3-hole probe according to a preferred embodiment of the invention.
Figure 5:
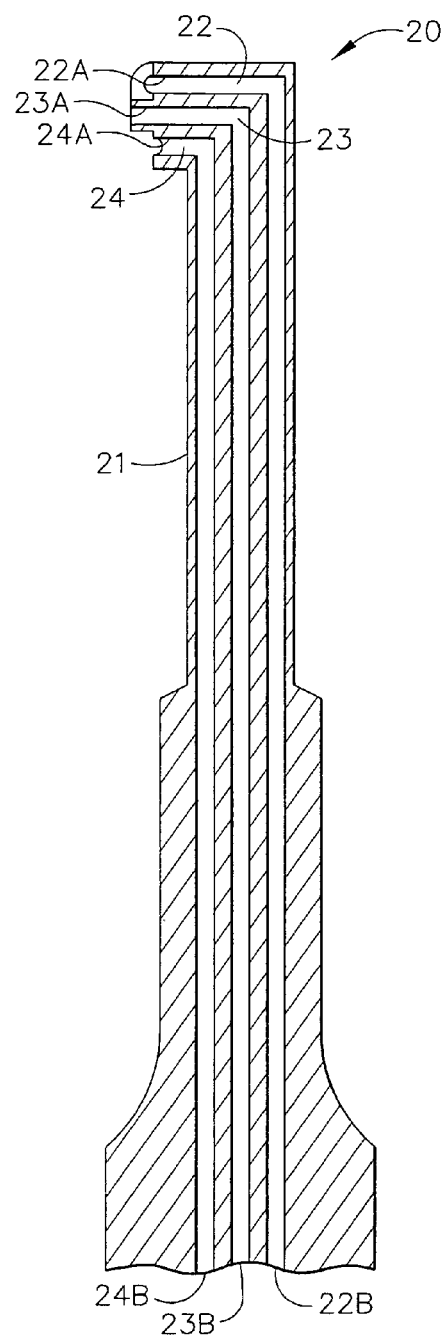
FIG. 5 is a side elevation of a 3-hole probe according to another preferred embodiment of the invention.

Referring now to FIGS. 3 and 4, a 3-hole probe according to an embodiment of the invention is shown at reference numeral 10. Probe 10 comprises a probe body 11 in which is formed three individual tubes defining bores 12,13,14. Bores 12,13, and 14 communicate with respective bore entrance openings 12A, 13A, and 14A and bore exit openings 12B, 13B and 14B. The bore entrance openings 12A, 13A, and 14A are formed at right angles to the longitudinal axis of the probe body 11 and, as best shown in FIG. 3, are "stacked" so that all three bore entrance openings 12A, 13A, and 14A are aligned along an axis "L" parallel to the longitudinal axis of the probe body 11. Note that the bore openings 12B and 14B are chamfered at opposing 45 degree angles. While the manner of construction is incidental to the geometry of the probe 10, in one embodiment as shown in FIGS. 3 and 4, the three bores 12,13 and 14 are formed from three individual tubes. Alternatively, as shown in FIG. 5, a probe 20 is comprised of a probe body 21 formed by forming three elongate bores 22, 23 and 24 in a single blank. Opposite ends of the tubes 22, 23 and 24 define probe entrance openings 22A, 23A and 24A, and probe exit openings 22B, 23B and 24B. As with the probe 10, the bore entrance openings 22A, 23A, and 24A are formed at right angles to the longitudinal axis of the probe body 21 and, as best shown in FIG. 5, are "stacked" so that all three bore entrance openings 22A, 23A, and 24A reside in alignment with each other and parallel to the longitudinal axis of the probe body 21.

In both probe 10 and probe 20 the dimensions and sensor interfaces are conventional. In one preferred embodiment, the probe 10 at the bore entrance openings 12A, 13A and 14A has a width "W" of about 0.5 mm (0.02 in.) and a depth "D" from the top of the bore entrance opening 12A to the bottom of the bore entrance opening 14A of about 2.5 mm (0.10 in.).

Figure 6:
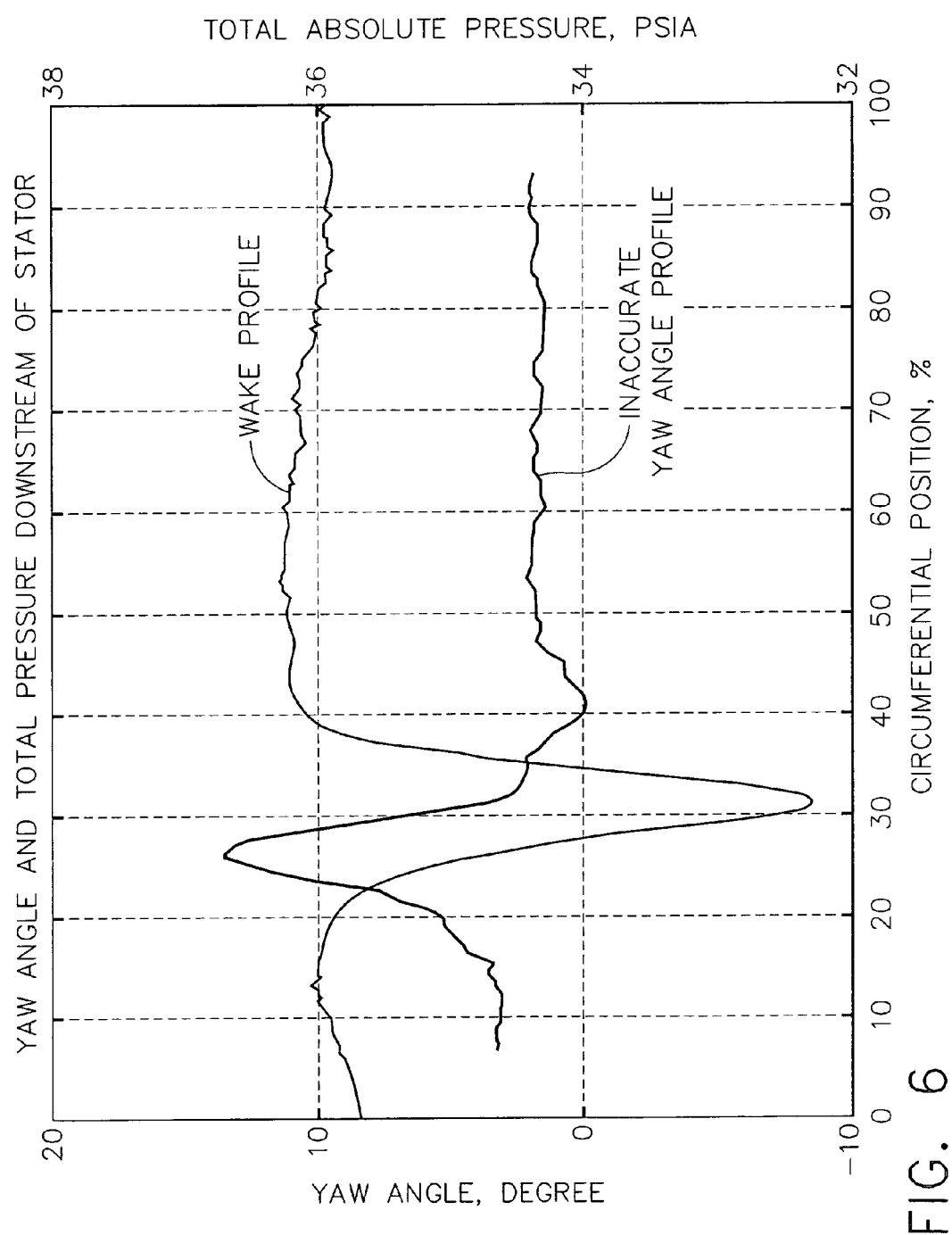
FIG. 6 is a chart plotting yaw angle vs. circumferential position using a prior art 3-hole probe.
Figure 7:
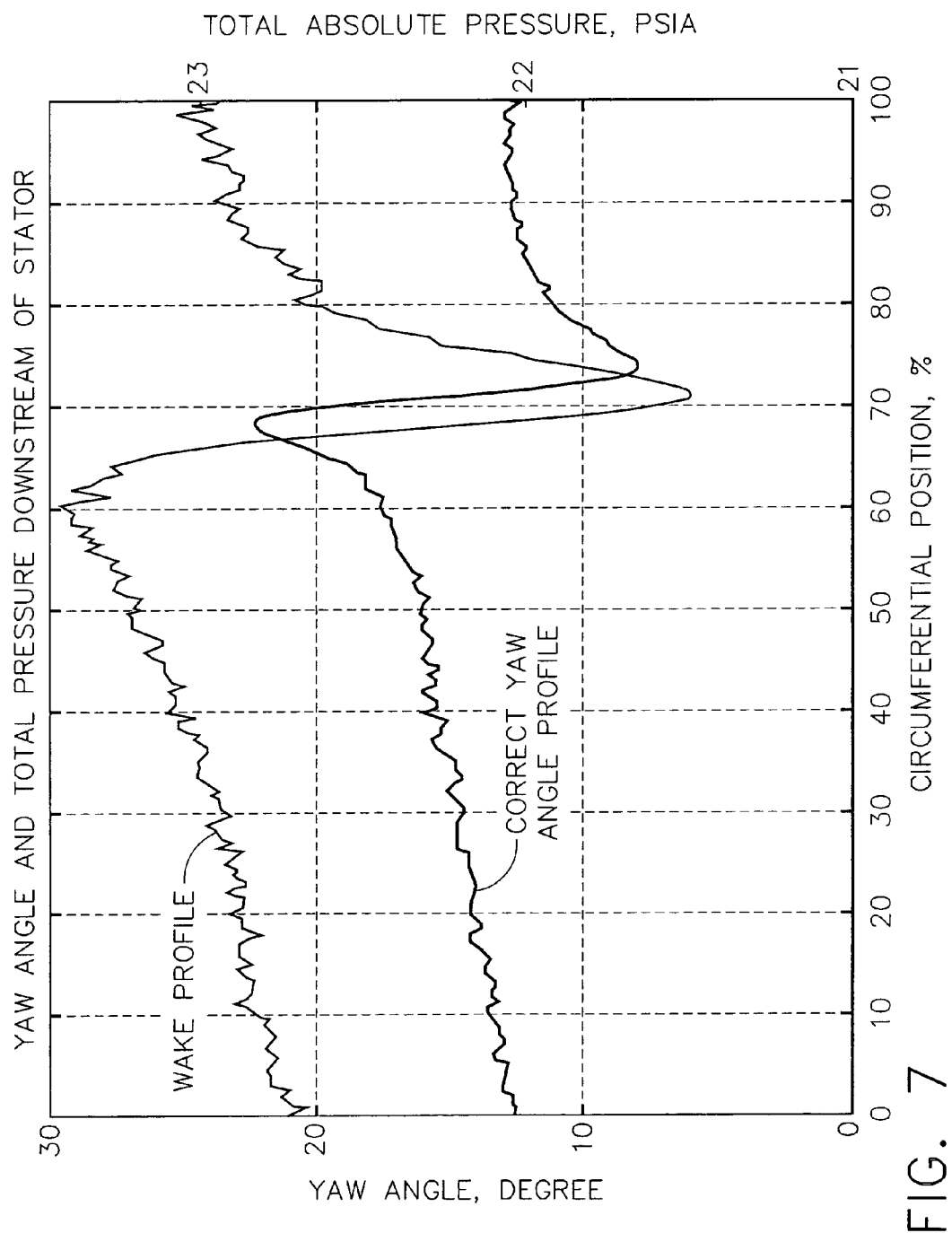
FIG. 7 is chart plotting yaw angle vs. circumferential position using a 3-hole probe according to an embodiment of the invention.

Referring now to FIGS. 6 and 7, a comparison indicates the improvement in yaw angle profile achieved by use of the probe 10 according to the invention, FIG. 7 representing the improved accuracy of the flow angle measurement near a blade trailing edge of a turbomachine stator in contrast to a less accurate determination shown in FIG. 6, using a conventional 3-hole probe as shown in FIGS. 1 and 2.

Figure 8:
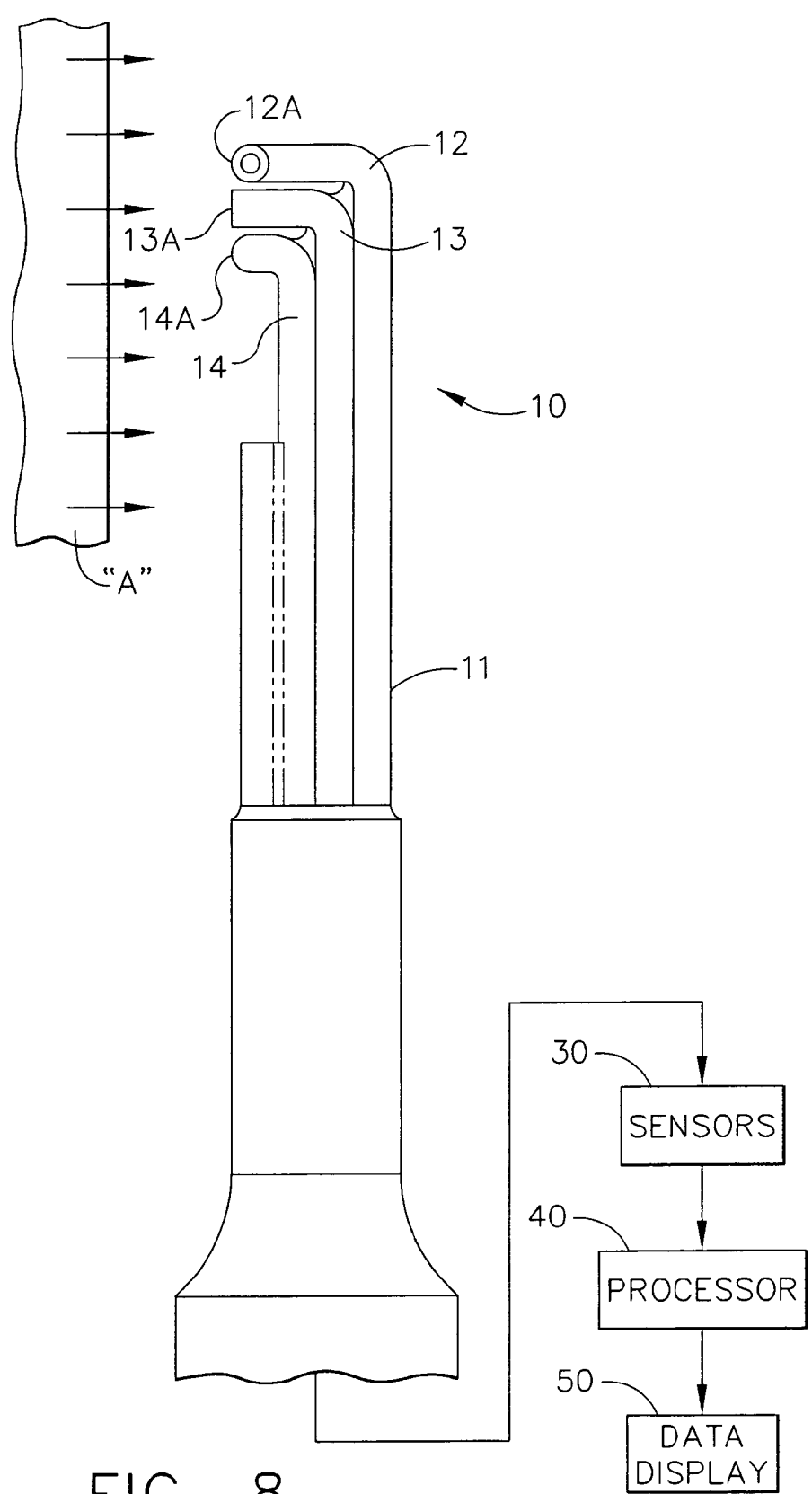
FIG. 8 is a diagrammatic side elevation showing the 3-hole probe according to an embodiment of the invention aligned with the trailing edge of an airfoil.
Figure 9:
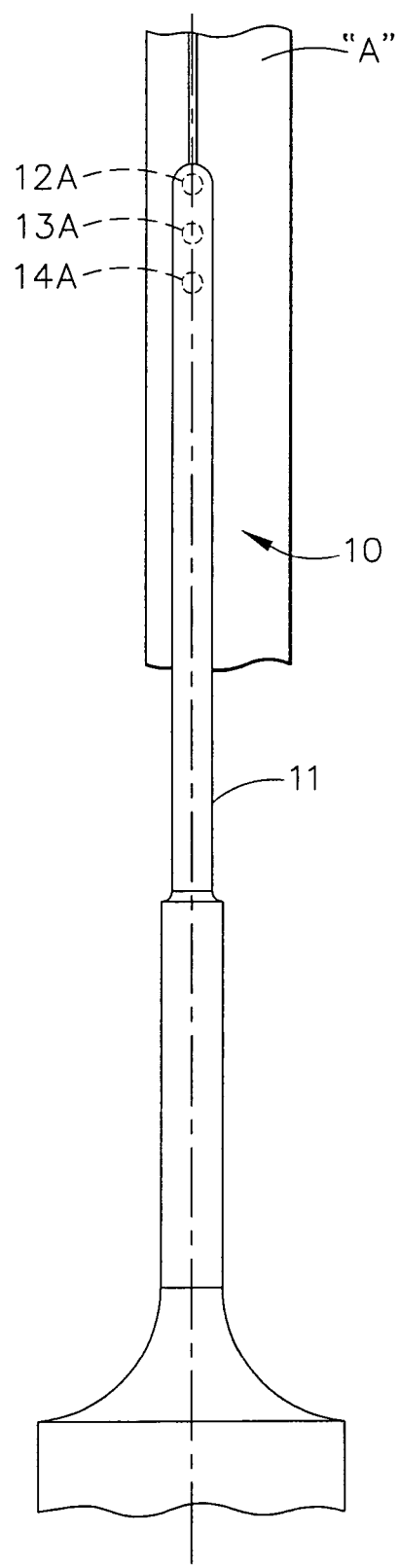
FIG. 9 is a diagrammatic end view showing the 3-hole probe according to an embodiment of the invention aligned with the trailing edge of an airfoil.

Referring now to FIGS. 8 and 9, orientation of the probe 10 relative to the trailing edge of an airfoil is indicated. The probe 10 is inserted into proximity of the airfoil "A" so as to permit alignment of the bore entrance openings 12A, 13A and 14A and the elongate probe body 11 parallel to the airfoil wake generated by the airfoil "A". The arrangement of the bore entrance openings 12A, 13A, 14A parallel to the longitudinal axis of the probe 10 insures that all three entrance openings will be simultaneously inside or outside the airfoil wake.

Circumferential and radial displacement of the probe 10 according to a predetermined routine allows the pressures at each of the bore entrance openings 12A, 13A and 14A to be transmitted to individual sensors 30 for each probe position. This pressure information together with information on the position and orientation of the probe 10 permits downstream processing to determine the desired flow angle and total pressure values. The sensors 30 may be piezoresistive or other known and conventional sensor types.

As is best shown in FIG. 9, the longitudinal axis of the probe 10 resides generally along the longitudinal axis of the trailing edge of the airfoil "A" and is displaced circumferentially and radially during data capture. Pressure values from the sensors 30 are transmitted to a processor 40 where flow angle and total pressure data are generated and transmitted to a data display device 50. The data display device will also normally include suitable digital recording capability for storing the input values and process-derived data.

A 3-hole probe and method of determining airfoil wake profiles in turbomachines is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A pressure sensing probe, comprising:
    (a) a probe body;
    (b) the probe body defining at least two bores communicating with respective bore entrance openings and bore exit openings therein for receiving a single fluid flow along a longitudinal direction pressure transition boundary into the bore entrance openings and through the bores;
    (c) the bore entrance openings being aligned along an axis of symmetry parallel with a longitudinal axis of the probe body and in a common plane for permitting alignment of the plurality of bore entrance openings along the plane of the longitudinal flow direction being sensed; and (d) the bore exit openings adapted for communication with respective sensors for sensing the fluid flow and converting the fluid flow into a signal for downstream signal processing.

2. A pressure sensing probe according to claim 1, wherein the probe body defines three bores having respective adjacent bore entrance openings.

3. A pressure sensing probe according to claim 1, wherein the probe body is comprised of at least two tubular members defining respective ones of the bore entrance openings.

4. A pressure sensing probe according to claim 1, wherein the probe body defines a centrally-disposed bore opening and two opposed outer bore openings, the two opposed outer bore openings each define an offset angle from an axis of flow of the centrally-disposed bore opening.

5. A pressure sensing probe according to claim 4, wherein said probe body defines a right-angle bend proximate the bore entrance openings and the offset angle is 45 degrees.

6. A pressure sensing probe for measuring flow angle and total pressure of a wake flow exiting a trailing edge of an airfoil of a turbomachine, comprising:
(a) an elongate probe body;
(b) the probe body defining a plurality of bores communicating with respective adjacent and axially-aligned bore entrance openings and bore exit openings therein for receiving a wake fluid flow into the bore entrance openings and through the bores; (c) the bore entrance openings being aligned along an axis parallel with a longitudinal axis of the probe body for permitting alignment of the plurality of bore entrance openings and the elongate probe body parallel to the airfoil wake generated by the airfoil; and
(d) the bore exit openings adapted for communication with respective sensors for sensing the airfoil wake fluid flow and generating a signal for downstream signal processing into data representing values selected from the group consisting of flow angle and total pressure of the airfoil wake.

7. A pressure sensing probe according to claim 6, wherein the probe body defines three bores having respective adjacent bore entrance openings.

8. A pressure sensing probe according to claim 6, wherein the probe body is comprised of at least two tubular members defining respective ones of the bore entrance openings.

9. A pressure sensing probe according to claim 6, wherein the probe body defines a unitary elongate structure having the at least two bores integrally-formed therein.

10. A pressure sensing probe according to claim 6, wherein said probe body defines a right-angle bend proximate the bore entrance openings.

11. A method of sensing fluid flow along a plane of a longitudinal pressure transition boundary, comprising the steps of:
(a) providing a pressure sensing probe, comprising:
(i) a probe body;
(ii) the probe body defining at least two bores communicating with respective bore entrance openings and bore exit openings therein for receiving a fluid flow Into the bore entrance openings and through the bores;
(iii) the bore entrance openings being aligned along an axis parallel with a longitudinal axis of the probe body;
(iv) the bore exit openings adapted for communication with respective sensors for sensing the fluid flow and converting the fluid flow into a signal for downstream signal processing;

(b) positioning the probe relative to a flow direction wherein the longitudinal axis of the probe body and the bore entrance openings extend along the plane of a longitudinal flow;
(c) intersecting the fluid flow along the plane of the longitudinal flow; and
(d) transmitting the fluid flow along the bores to respective fluid flow sensors adapted to convert the fluid flow into signals representative of the fluid flow;
(f) converting the fluid flow into signals representative of the fluid flow; and
(g) transmitting the signals to a downstream processor.

12. A method according to claim 11, wherein the probe body defines three bores having respective adjacent bore entrance openings.

13. A method of measuring flow angle and total pressure of an turbomachine airfoil wake, comprising the steps of:
(a) providing:
(I) an elongate probe body;
(ii) the probe body defining a plurality of bores communicating with respective adjacent and axially-aligned bore entrance openings and bore exit openings therein for receiving a wake fluid flow into the bore entrance openings and through the bores;
(iii) the born entrance openings being aligned along an axis parallel with a longitudinal axis of the probe body; the plurality of bore entrance openings and the elongate probe body parallel to the airfoil wake generated by the airfoil; and
(iv) the bore exit openings adapted for communication with respective sensors for sensing the airfoil wake fluid flow and converting the fluid flow into a signal for downstream signal processing;
(b) positioning the probe relative to a flow direction wherein the longitudinal axis of the probe body and the bore entrance openings extend along the longitudinal axis of the airfoil wake generated by the airfoil;
(c) intersecting the airfoil wake in a plurality of spaced-apart positions along the longitudinal axis of the airfoil wake;
(d) transmitting the fluid flow along the bores to respective fluid flow sensors adapted to convert the fluid flow into signals representative of the fluid flow of the airfoil wake;
(f) converting the fluid flow into signals representative of the fluid flow of the airfoil wake; and
(g) transmitting the signals to a downstream signal processor for determining at least one value selected from the group consisting of flow angle and total pressure of the airfoil wake.

14. A pressure sensing probe according to claim 13, wherein the probe body defines three bores having respective adjacent bore entrance openings.

15. A pressure sensing probe according to claim 13, wherein the probe body is comprised of at least two tubular members defining respective ones of the bore entrance openings.

16. A pressure sensing probe according to claim 13, wherein the probe body defines a unitary elongate structure having the at least two bores integrally-formed therein.

17. A pressure sensing probe according to claim 13, wherein said probe body defines a right-angle bend proximate the bore entrance openings.

* * * * *

UNITED STATES PATENT AND TRADEMARK OFFICE
CERTIFICATE OF CORRECTION

| | | |
|---|---|---|
| PATENT NO. | : 7,073,386 B2 | Page 1 of 1 |
| APPLICATION NO. | : 10/867156 | |
| DATED | : July 11, 2006 | |
| INVENTOR(S) | : Hyoun-Woo Shin | |

It is certified that error appears in the above-identified patent and that said Letters Patent is hereby corrected as shown below:

Column 5, line 59, delete "Into" and enter -- into --.

Column 6, line 10, delete "(f)" and enter -- (e) --.

Column 6, line 12, delete "(g)" and enter -- (f) --.

Column 6, line 17, delete "an turbomachine" and enter -- a turbomachine --.

Column 6, line 19, delete "(l)" and enter -- (i) --.

Column 6, line 45, delete "(f)" and enter -- (e) --.

Column 6, line 47, delete "(g)" and enter -- (f) --.

Signed and Sealed this

Eleventh Day of December, 2007

JON W. DUDAS
*Director of the United States Patent and Trademark Office*